United States Patent [19]

Castellon

[11] Patent Number: 4,995,849
[45] Date of Patent: Feb. 26, 1991

[54] FORK FOR CARDAN JOINTS AND METHOD OF FORMING SAME

[76] Inventor: Melchor D. Castellon, Disputacion, 455, 080103 Barcelona, Spain

[21] Appl. No.: 427,948

[22] Filed: Oct. 25, 1989

Related U.S. Application Data

[63] Continuation of Ser. No. 117,297, Nov. 6, 1987, abandoned.

[30] Foreign Application Priority Data

Nov. 6, 1986 [ES] Spain ................... 86/03090

[51] Int. Cl.⁵ .............................................. F16D 3/26
[52] U.S. Cl. .................................................. 464/134
[58] Field of Search .............................. 464/134, 136

[56] References Cited

U.S. PATENT DOCUMENTS

| | | | |
|---|---|---|---|
| 2,067,282 | 1/1937 | Padgett | 464/134 X |
| 2,067,283 | 1/1937 | Padgett | 464/134 |
| 3,045,455 | 7/1962 | Potgieter | 464/134 |

FOREIGN PATENT DOCUMENTS

| | | | |
|---|---|---|---|
| 579501 | 8/1946 | United Kingdom | 464/134 |
| 2040395 | 8/1980 | United Kingdom | 464/134 |
| 2053417 | 2/1981 | United Kingdom | 464/134 |

*Primary Examiner*—Daniel P. Stodola
*Attorney, Agent, or Firm*—Fleit, Jacobson, Cohn, Price, Holman & Stern

[57] ABSTRACT

A fork for cardan joints consists of a single-piece body produced by stamping from metal sheet. The fork has on its side arms (4, 4') individual longitudinal reinforcing ribs (8, 8') produced during the stamping process itself and individual collars or flanges (6, 6') around the aligned apertures (5, 5') thereof into which fit the bearings that support the pivots of the corresponding cross member. The dome portion (3) connects the arms to collar portion (1) which has a splined hole (2) for connecting the fork to a shaft.

6 Claims, 2 Drawing Sheets

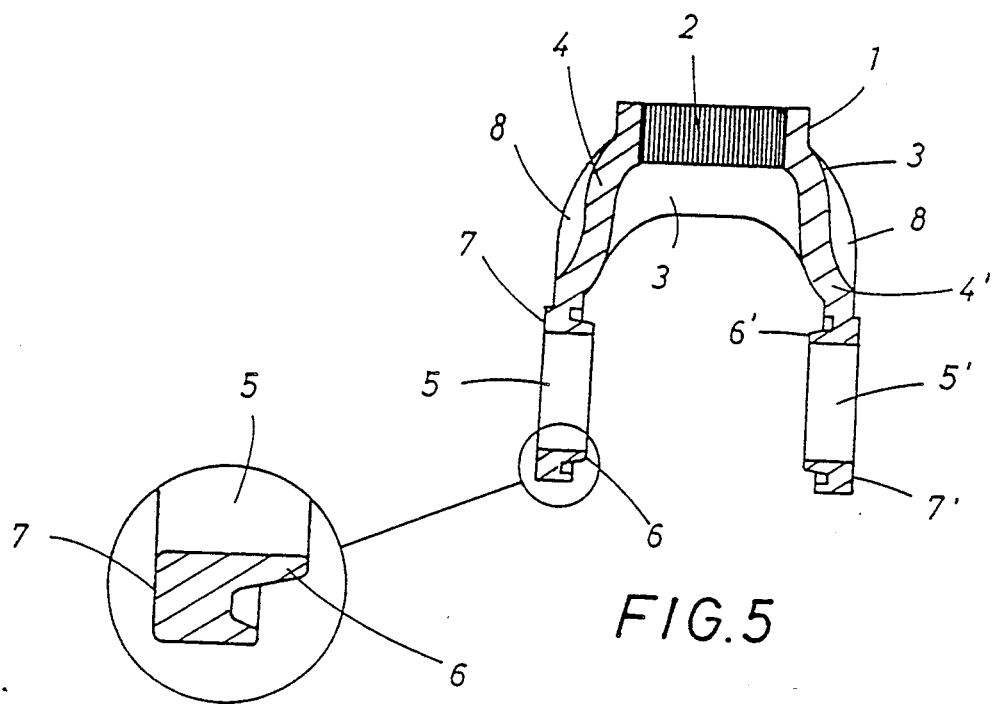
FIG. 5
FIG. 7
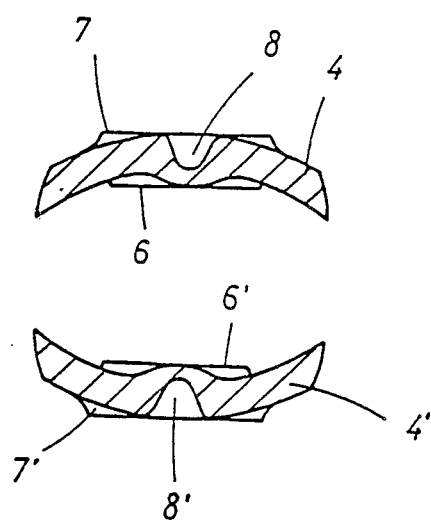
FIG. 6

FORK FOR CARDAN JOINTS AND METHOD OF FORMING SAME

This is a continuation of application Ser. No. 07/117,297, filed Nov. 6, 1987 which in turn is now abandoned.

BACKGROUND OF THE INVENTION

The present invention relates to an improved fork which, although it can, of course, permit other applications, has been especially designed with a view to its integration in universal joints of the cardan or similar type, and, more specifically, with a view to its integration in joints of this type that form part of the steering column of motor vehicles.

As is well known, joints of the above-mentioned type comprise two identical or similar forks (yokes) which are rigidly attached to the ends of the two tubes or bars which are to be jointed together, which forks are joined together by means of a cross which comprises two pairs of pivots aligned with their respective pivot axes at right-angles and arranged to fit into corresponding bearings housed in the opposite and aligned orifices provided in both arms of each of the forks.

The abovementioned forks constitute, as will be appreciated, a basic component of the joint, since it is by means of the forks that the rotational forces are transmitted between the two segments or lengths into which the column is divided, and since the forks must afford sufficient support for bearings into which the pivots of the cross are fitted. These forks are traditionally produced by casting or by forging, but recently, in order to lighten their weight and to reduce the cost of manufacture, they have been produced from a tube or also from two symmetrical stamped parts which are joined together by means of welding. However, none of these solutions can be classed as definitive, since the most widely used of them requires a pronounced curvature to be imparted to the arms of the fork with the aim of increasing its rigidity and affording sufficient support for the bearings, which makes assembly difficult and reduces the maximum angles which the joint can allow.

BRIEF SUMMARY OF THE INVENTION

The object of the present invention is to provide a fork for joints of the cardan type which clearly overcomes the defects of known forks, making it possible to lighten the weight of the column assembly and to reduce the manufacturing costs very substantially without any reduction in the technical performance of the joint, but advantageously providing improved performance.

To this end, according to the present invention, the joint is composed of a single-piece body, produced by stamping, from metal sheet of suitable quality. In this manner, the fork assembly can be obtained in a single stamping operation, with a progressive die, and has only to undergo a final grinding operation on the orifices or housings intended to receive the bearings which ensure the free play of the cross, and it is even possible to omit this final operation if a sufficiently accurate stamping operation can be carried out. Therefore, the manufacturing costs of the fork are reduced to a minimum, it being possible in addition, by virtue of the characteristics which will be referred to later, for the assembly to be produced from metal sheet of relatively small thickness, which also contributes to reducing the costs and enables a substantial reduction in weight to be achieved.

The above-mentioned single-piece body produced by stamping comprises a cylindrical collar equipped with means to facilitate its attachment to the end of the corresponding tube or bar, and a dome having an arched generatrix, coaxial with the collar, which dome forms the reinforcing base which ensures the rigidity of the arms or wings of the fork which are substantially flat and parallel and which have at their free ends the aligned circular apertures which are arranged to receive the corresponding bearings. These circular apertures are individually surrounded by flanges or internal collars, which form an important characteristic of the invention inasmuch as, apart from also interacting to give the assembly the necessary level of rigidity, they afford a large surface to support the bearings, achieving exact alignment of the latter despite the small thickness of the metal sheet from which the assembly is produced. According to an additional characteristic of the invention, these collars or flanges are produced by displacement of the material, forcing it to flow during a stage of the stamping process.

According to an important characteristic of the invention, each of the wings or arms of the fork has a central, longitudinal, rectilinear rib of U-shaped section and of large size, which extends from the vicinity of the aperture for receiving the bearing to the vicinity of the collar through which the coupling of the fork to the shaft is achieved. This rib plays a highly important role, since it guarantees the rigidity of the fork when the latter is subjected to the torsional stresses that it will undergo during the normal operation of the joint.

BRIEF DESCRIPTION OF THE DRAWINGS

The present invention will be described in more detail below with reference to the accompanying drawings in which, in a manner that is in no way intended as limiting, a specific example of a practical embodiment of the invention is shown.

In the drawings:

FIGS. 5 and 6 are individual section views taken along the lines V—V and VI—VI, respectively, of FIG. 4.

And, finally, FIG. 7 is a partial section view on a substantially enlarged scale of the portion indicated by a circle in FIG. 5.

DETAILED DESCRIPTION OF THE INVENTION

Figure 1:
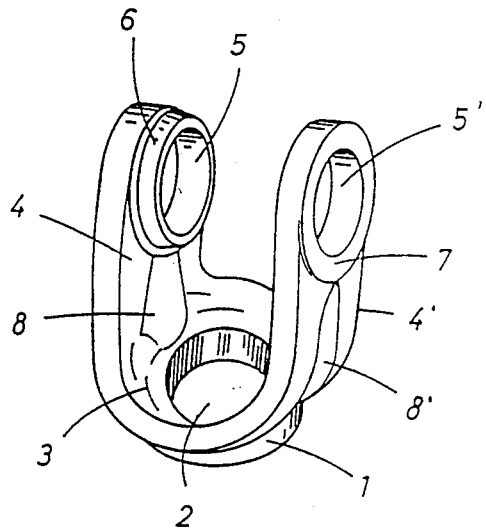
FIGS. 1 and 2 are individual perspective views, opposite to each other, of a fork assembly for cardan joints produced according to the invention.
Figure 3:
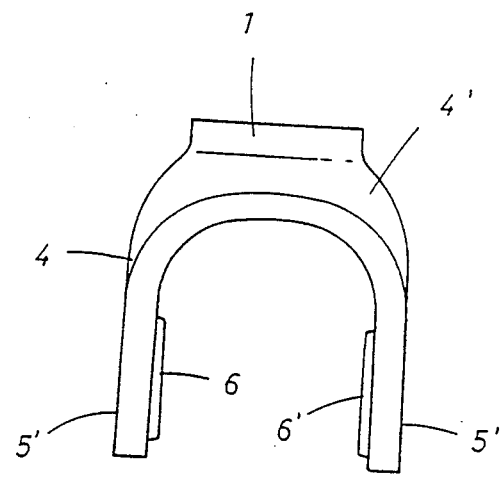
FIGS. 3 and 4 are elevation views, at right angles to each other, of the same fork shown in FIGS. 1 and 2.
Figure 2:
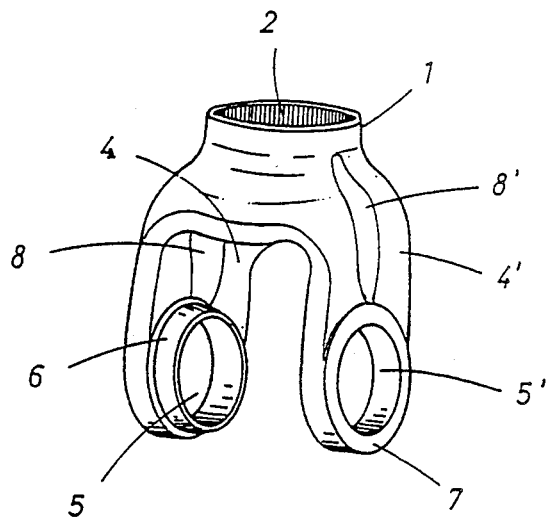
Figure 4:
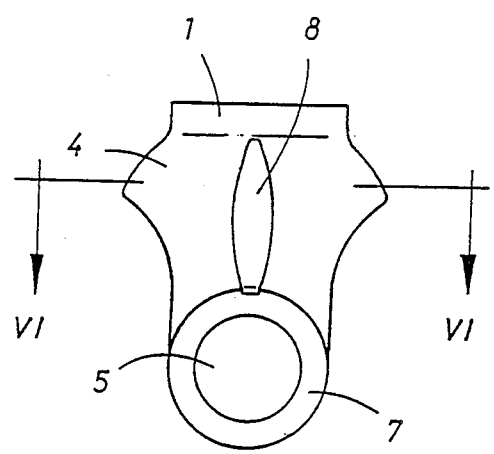

As can be seen in the drawings, the fork according to the present invention, as has already been indicated, will essentially be produced by means of a stamping operation from metal sheet of suitable quality. The fork includes a cylindrical collar 1 equipped with means for coupling to the end of the corresponding shaft, which coupling means preferably, although not necessarily, consist of a regular splining 2 arranged so as to enable the coupling to be assembled by pressure. The fork also includes a part 3 in the approximate form of a body of revolution having an arched generatrix extending completely around the circumference of the fork forming a kind of dome, coaxial with the collar 1, which domed part 3 plays an important mechanical part with a view to ensuring the rigidity of the assembly. The fork further has two symmetrical wings or arms 4, 4', which are substantially flat and parallel and which extend from the dome 3 without a break. The dome part 3 connects the arms to the collar 1. At the ends of these wings or arms, there are provided individual circular apertures 5, 5' which are identical and aligned, and intended to receive the bearings into which the aligned axes of the pivot pins of the corresponding across fit, there being around each one of these apertures a collar or internal flange 6, 6' whose external surface can advantageously have some degree of conicity. These flanges 6, 6' apart from playing a reinforcement role contributing to the resistance of the assembly to distortion, also advantageously result in the axial dimension of the aperture being substantially greater than the thickness of the metal sheet from which the assembly is produced, so that it affords a sufficiently large surface of support to the corresponding bearing, even when a sheet of relatively small thickness is used. To this same end, the above-mentioned apertures 5, 5' may also, where appropriate, be equipped with an external flange 7, 7' which is generally of considerably smaller dimensions.

According to an additional advantageous characteristic of the invention, the abovementioned flanges are produced by displacement of the material, by forcing it to flow during a stage of the stamping process. That notwithstanding, it would also be appropriate to produce during the stamping process the wings or arms of the fork devoid of apertures, or equipped with apertures of a diameter less than the definitive diameter, and to form these apertures subsequently by drilling, according to a technique known per se which enables the flanges to be obtained during the drilling operation itself. In any case, the above-mentioned apertures must undergo a final grinding operation, except where sufficient accuracy is achieved during the stamping operation, this being perfectly possible, although it involves a high degree of technical difficulty.

Finally, according to another characteristic of the invention, there are formed on both arms of the fork during the stamping process individual longitudinal, rectilinear ribs 8, 8' of U-shaped section and of large size, which extend from the apertures 5, 5' to the collar 1. In a preferred embodiment, these ribs have a horizontal cross-section that progressively decreases from the central (collar) region to the ends. The rigidity function of the ribs 8, 8' has already been mentioned, although it is of interest to point out that, in practice, although this would not be without its disadvantages, each rib 8, 8' could be replaced by other equivalent components such as, for example, by two or more parallel or divergent ribs of smaller cross-section, arranged longitudinally on the arms of the fork and likewise produced during the stamping process itself.

It should be appreciated that the invention is in no way limited to the exemplary embodiment described and shown, but that, many variations are permitted, some of which have already been noted and all of which will be considered as falling within the scope of the invention which is limited only be the appended claims.

I claim:

1. A fork for cardan joints, having a single-piece body of stamped sheet metal, comprising:
   a cylindrical collar portion;
   means on said collar portion for coupling the fork to the end of a corresponding shaft;
   a dome portion having an arched generatrix and extending completely around the circumference of the fork, the dome portion being coaxial with said collar portion;
   two symmetrical substantially flat and parallel wing-like arms extending from respective diametrically opposite positions of said dome portion without a break, and having free outer ends, said dome portion connecting said arms to said collar portion;
   individual circular, mutually aligned flanged apertures through said free outer ends; and
   a central longitudinal rectilinear rib of U-shaped cross-section and of large size extending centrally along each of said arms from proximate each aperture thereof and along said dome portion to proximate said collar portion.

2. A fork as claimed in claim 1, wherein said flanges surrounding each of said apertures form a collar around each said aperture, so that the axial dimension of each aperture is substantially greater than the thickness of the metal sheet from which the assembly is produced.

3. A fork as claimed in claim 2 wherein each flange has an external surface surrounding each aperture having some degree of conicity.

4. A fork as claimed in claim 3, wherein each central longitudinal rib on each arm has an arch shaped cross-section which progressively decreases from the region of the cylindrical collar portion to the ends of said arms.

5. A fork as claimed in claim 2, wherein each central longitudinal rib on each arm has an arch shaped cross-section which progressively decreases from the region of the cylindrical collar portion to the ends of said arms.

6. A fork as claimed in claim 1, wherein each central longitudinal rib on each arm has an arch shaped cross-section which progressively decreases from the region of the cylindrical collar portion to the ends of said arms.

* * * * *